US009990799B2

(12) United States Patent
Frost et al.

(10) Patent No.: US 9,990,799 B2
(45) Date of Patent: Jun. 5, 2018

(54) TABLE GAMES AND RELATED METHODS

(71) Applicants: SG Gaming ANZ Pty Ltd, Silverwater (AU); Crown Melbourne Limited, Southbank (AU)

(72) Inventors: Brian Frost, Cronulla (AU); Jason Choo, Ashfield (AU)

(73) Assignees: SG Gaming ANZ PTY LTD, Silverwater (AU); Crown Melbourne Limited, Southbank (AU)

(*) Notice: Subject to any disclaimer, the term of this patent is extended or adjusted under 35 U.S.C. 154(b) by 527 days.

(21) Appl. No.: 13/789,189

(22) Filed: Mar. 7, 2013

(65) Prior Publication Data

US 2013/0184044 A1 Jul. 18, 2013

Related U.S. Application Data

(63) Continuation of application No. 11/541,898, filed on Oct. 2, 2006, now abandoned, which is a continuation of application No. 10/730,521, filed on Dec. 8, 2003, now abandoned, which is a continuation of application No. 10/095,412, filed on Mar. 12, 2002, now Pat. No. 6,659,866, which is a continuation of
(Continued)

(30) Foreign Application Priority Data

Mar. 8, 2000 (AU) ...................................... PQ6107

(51) Int. Cl.
*A63F 13/00* (2014.01)
*G07F 17/32* (2006.01)
*A63F 3/08* (2006.01)
*A63F 5/04* (2006.01)

(52) U.S. Cl.
CPC .......... *G07F 17/3225* (2013.01); *A63F 3/081* (2013.01); *G07F 17/32* (2013.01); *G07F 17/3262* (2013.01); *G07F 17/3276* (2013.01); *A63F 5/04* (2013.01)

(58) Field of Classification Search
CPC .. G07F 17/3225; G07F 17/32; G07F 17/3262; G07F 17/3276; A63F 3/081; A63F 5/05; A63F 5/04
USPC .... 273/142 E, 142 F, 142 G, 142 D; 463/16, 463/17
See application file for complete search history.

(56) References Cited

U.S. PATENT DOCUMENTS 4,033,588 A * 7/1977 Watts .............................. 463/18
4,339,798 A * 7/1982 Hedges et al. .................. 463/26
4,365,810 A 12/1982 Richardson
(Continued)

FOREIGN PATENT DOCUMENTS

DE 32 33 405 3/1984
DE 34 03 018 8/1985
(Continued)

OTHER PUBLICATIONS

Novo PR 1/99 (Press release 1/99) 1 page.*
(Continued)

*Primary Examiner* — Vishu Mendiratta
(74) *Attorney, Agent, or Firm* — TraskBritt

(57) ABSTRACT

A gaming table in which the outcome of the game is determined manually, and in which players place bets electronically and wins or losses are calculated electronically. The gaming system is applicable to any suitable game including roulette.

1 Claim, 4 Drawing Sheets

Related U.S. Application Data application No. 09/661,154, filed on Sep. 13, 2000, now abandoned.

(56) References Cited

U.S. PATENT DOCUMENTS

| | | | | |
|---|---|---|---|---|
| 4,467,424 | A | | 8/1984 | Hedges et al. |
| 4,856,787 | A | | 8/1989 | Itkis et al. |
| 5,188,363 | A | | 2/1993 | Marnell, II et al. |
| 5,263,715 | A | | 11/1993 | Matsumoto et al. |
| 5,326,104 | A | * | 7/1994 | Pease et al. .................... 463/18 |
| 5,393,057 | A | | 2/1995 | Marnell, II |
| 5,407,199 | A | | 4/1995 | Gumina |
| 5,411,258 | A | | 5/1995 | Wilson et al. |
| 5,540,442 | A | | 7/1996 | Orselli et al. |
| 5,569,082 | A | | 10/1996 | Kaye |
| 5,588,650 | A | | 12/1996 | Eman et al. |
| 5,618,332 | A | | 4/1997 | Ekiner et al. |
| 5,624,119 | A | | 4/1997 | Leake |
| 5,628,684 | A | | 5/1997 | Bouedec et al. |
| 5,639,092 | A | | 6/1997 | MacAisa et al. |
| 5,688,174 | A | | 11/1997 | Kennedy et al. |
| 5,728,002 | A | | 3/1998 | Hobert et al. |
| 5,743,798 | A | | 4/1998 | Adams et al. |
| 5,755,440 | A | | 5/1998 | Sher et al. |
| 5,757,730 | A | * | 5/1998 | Terzian ........................... 368/82 |
| 5,762,552 | A | | 6/1998 | Vuong et al. |
| 5,770,533 | A | | 6/1998 | Franchi et al. |
| 5,775,993 | A | | 7/1998 | Fentz et al. |
| 5,813,912 | A | | 9/1998 | Shultz et al. |
| 5,848,936 | A | | 12/1998 | Morrison et al. |
| 5,857,909 | A | | 1/1999 | Rubin et al. |
| 5,934,999 | A | | 8/1999 | Valdez et al. |
| 5,976,016 | A | | 11/1999 | Moody et al. |
| 5,980,384 | A | | 11/1999 | Barrie |
| 6,001,016 | A | | 12/1999 | Walker et al. |
| 6,050,895 | A | * | 4/2000 | Luciano et al. .................. 463/7 |
| 6,059,659 | A | | 5/2000 | Busch et al. |
| 6,165,069 | A | | 12/2000 | Sines et al. |
| 6,176,487 | B1 | | 1/2001 | Eklund |
| 6,186,505 | B1 | | 2/2001 | Perrie et al. |
| 6,220,961 | B1 | | 4/2001 | Keane et al. |
| 6,224,482 | B1 | | 5/2001 | Bennett |
| 6,259,568 | B1 | | 7/2001 | Rybczynski et al. |
| 6,264,561 | B1 | | 7/2001 | Saffari et al. |
| 6,283,855 | B1 | | 9/2001 | Bingham |
| 6,283,856 | B1 | | 9/2001 | Mothwurf |
| 6,290,229 | B1 | | 9/2001 | Perez |
| 6,296,568 | B1 | | 10/2001 | Tracy |
| 6,296,569 | B1 | | 10/2001 | Congello, Jr. |
| 6,299,533 | B1 | | 10/2001 | Parra et al. |
| 6,309,299 | B1 | | 10/2001 | Weiss |
| 6,336,633 | B1 | | 1/2002 | Webb |
| 6,354,592 | B1 | | 3/2002 | Virzi |
| 6,361,437 | B1 | | 3/2002 | Walker et al. |
| 6,508,709 | B1 | | 1/2003 | Karmarkar |
| 6,572,474 | B2 | | 6/2003 | Rudd |
| 6,659,866 | B2 | | 12/2003 | Frost et al. |
| 6,755,741 | B1 | | 6/2004 | Rafaeli |
| 7,066,815 | B2 | | 6/2006 | Walker et al. |
| 7,128,482 | B2 | | 10/2006 | Meyerhofer et al. |
| 7,285,048 | B2 | | 10/2007 | Karmarkar |
| 8,087,984 | B2 | | 1/2012 | Okujyo et al. |
| 8,109,821 | B2 | | 2/2012 | Kovacs et al. |
| RE44,439 | E | | 8/2013 | Rafaeli |
| 2001/0004606 | A1 | | 6/2001 | Tracy et al. |
| 2001/0004609 | A1 | | 6/2001 | Walker et al. |
| 2002/0010014 | A1 | | 1/2002 | Parra et al. |
| 2002/0022521 | A1 | | 2/2002 | Idaka |
| 2004/0266533 | A1 | | 12/2004 | Gentles et al. |

FOREIGN PATENT DOCUMENTS

| | | | |
|---|---|---|---|
| EP | 0 542 664 | A2 | 11/1992 |
| EP | 0 599 769 | A2 | 11/1993 |
| EP | 0 689 172 | | 12/1995 |
| GB | 956 223 | | 4/1964 |
| GB | 1 544 962 | | 4/1979 |
| JP | 1293889 | | 11/1989 |
| WO | 02/18023 | A1 | 3/2002 |
| WO | 02/30529 | A1 | 4/2002 |

OTHER PUBLICATIONS

VIDCO, MTGM, Multi-Terminal Gaming Machine, prior to 2000, 2 pages.
1 pg advertisement "Tokens designed, with security in mind."
Advertisement Touchbet TM Roulette. (2 pgs).
Advertisement in Casino International, Nov. 1999, for Coinmaster Gaming LTD.
Advertisement in Casino International, Nov. 1999, for Sigma.
Advertisement in Casino International, Oct. 1999, for Coinmaster Gaming LTD.
Advertisement in InterGaming Magazine, Aug. 1999, for Touchbet Roulette.
Advertisement in InterGaming Magazine, Aug. 1999, for Victory.
Advertisement in InterGaming Magazine, Jan. 2000, for Victory.
Advertisement in InterGaming Magazine, Nov. 1998, for Novomatic.
Casino International magazine "Death of the Dollar" cover page and Coinmaster Gamine LTD advertisement. (2 pgs).
Casino International magazine, "Cultural Games: Is the game the same?" cover page and Coinmaster Gaming LTD advertisement. (2 pgs).
Casino International magazine; "Automatic for the people: The roulette revolution", pp. 21-26.
Clegg, Phil, "Will high-tech tables turn live gaming around?" InterGaming Magazine, Aug. 1999, p. 18-19.
Express, The Magazine of the TCS Group, Summer 1999.
InterGaming Magazine 1999 Worldwide Buyers Guide, Jul. 1999, Advertisement for Touchbet Roulette, (Sigma, Coinmaster).
InterGaming, The Specialist International Casino Magazine, Jul. 1999, cover page.
InterGaming, The Specialist International Casino Magazine, Nov. 1998, cover page with "Eight Player Configuration Linked Terminal Roulette Systems" Advertisement. (2 pages).
Martin, Martin, "The roulette revolution," Casino International, Aug. 1999, p. 21-22, 25-26.
Publication 1: New head of sales: 2 pages.
Publication 2: Press release Jan 1999: 1 page.
Publication 3: Press release Mar. 1999: 1 page.
Publication 4: Will high-tec table: 2 pages.
Publication 5: Novamatic presents: 3 pages.
Publication 6: Configuration: 3 pages.
TC's Express Spotlight Magazine, Summer 1999, Issue 1; Introduction of Team. (7 pages).
TC's. The World Wide Web cover page plus buyers guide. (2 pages).
TCSJohnHuxley.com, "Novo TouchBetTM" (10 pages).

* cited by examiner

TABLE GAMES AND RELATED METHODS

CROSS-REFERENCE TO RELATED APPLICATIONS

This application is a continuation of U.S. patent application Ser. No. 11/541,898, filed Oct. 2, 2006, pending, which is a continuation of U.S. patent application Ser. No. 10/730,521, filed Dec. 8, 2003, abandoned, which is a continuation of U.S. patent application Ser. No. 10/095,412, filed Mar. 12, 2002, now U.S. Pat. No. 6,659,866, issued Dec. 9, 2003, which is a continuation of U.S. patent application Ser. No. 09/661,154, filed Sep. 13, 2000, abandoned, the disclosure of each of which is hereby incorporated herein by this reference in its entirety.

TECHNICAL FIELD

This invention relates to table games such as roulette, traditionally played in casinos and similar gaming establishments.

BACKGROUND

Games of chance have been part of many societies for centuries and are ever present today. Casinos exist to provide gambling entertainment to the community in the form of many different games.

These games can generally be divided into two categories. The first is automatic games, such as poker machines, in which a player bets on various outcomes being generated. These outcomes are generated automatically, using sophisticated random (all pseudorandom) number generators. The player wins or loses depending upon the outcome of a particular game.

The second category of games is known as a table game, in which a human operator, known as a dealer or a croupier, determines the outcome of the game and pays betting players accordingly. Such table games include roulette and blackjack. In the case of blackjack, players are dealt a number of cards by a dealer, who also deals him or herself some cards. The cards themselves determine the outcome of a particular game, directed by the dealer, and influenced by individual players' choices of various parts of the game.

Simplistically, in roulette, players bet on where they think a ball, spun within a wheel divided into thirty-seven regions marked from 0-36, will land. After bets are placed, the wheel is spun and the ball is dropped onto the spinning wheel and is allowed to move freely until coming to rest in one of the thirty-seven regions of the wheel. Those players who bet on the correct number win, while those who did not, lose.

In both scenarios of the table games described above, all actions, including players betting, game outcome determination, calculation of winners and losers and subsequent settlement, are conducted manually.

This presents a number of problems. Firstly, mistakes can be made by the player in placing a bet, resulting in an invalid bet, while mistakes may be made by the croupier in determining winners and more particularly, in calculating and paying out wins. Furthermore, it is not uncommon for some players to attempt to cheat by surreptitiously increasing or decreasing a bet while the croupier is not looking once the outcome of a game is known.

Another problem lies with the comfort and confidence of the players. One of the attractions of automatic gaming machines is that the player does not need to deal with other people, which is an advantage if the player is not entirely familiar with or confident about the rules of the game and may be intimidated by other people observing this.

Another disadvantage of traditional gaming tables is that generally, only six players can play at a table at any one time. This is an inefficient use of space. Furthermore, their number within a given establishment is limited by legislation. Due to the limited number of tables, it is often difficult for players to find a place available at a table.

Further, due to the requirement of the croupier having to maintain full control including supervising players, taking bets, determining the outcome of the game, calculating and paying winnings, collecting losses and all the while trying to be aware of any instances of cheating, the number of players per table must be limited so as not to overtax the croupier. Accordingly, the overall profit of the casino derived from the game is limited because the ratio between the croupier's salary and the income generated from the players is not high.

It is, therefore, an object of the present invention to provide a table game that improves security and increases profit to the casino.

SUMMARY OF INVENTION

In broad terms the present invention provides a casino gaming table, in which the game itself is conducted using traditional, manual systems, and the players place bets and wins or losses are calculated using electronic means.

The core advantage of such an arrangement is that the croupier need only physically conduct the game elements, for example, spinning a roulette wheel. The croupier need not watch for irregularities or calculate wins and losses. As a result, play can proceed more rapidly, and more players can be accommodated simultaneously.

According to one aspect, the present invention provides a gaming table system including: a gaming surface, at least one manual random game outcome determinator, game outcome data capturing means and one or more electronic player terminals to allow one or more players to place bets electronically.

According to a further aspect, the present invention provides a method for operating a casino gaming table, the table including player terminals for players to electronically place bets on the outcome of a game, the method including the steps of:

- electronically receiving a betting amount from a player;
- manually determining a game outcome;
- calculating win/loss data in accordance with the outcome of the game; and
- electronically updating player terminals in accordance with the win/loss data.

Preferably, the system will include processing means for calculating win/loss data in accordance with the outcome of the game.

Preferably, the system also includes updating means for updating customer credit values in accordance with the win/loss data.

The system may also provide a countdown to inform the players of the time remaining before all bets must be placed.

BRIEF DESCRIPTION OF DRAWINGS

The invention will now be described in more detail with reference to the following figures.

DETAILED DESCRIPTION

Figure 1:
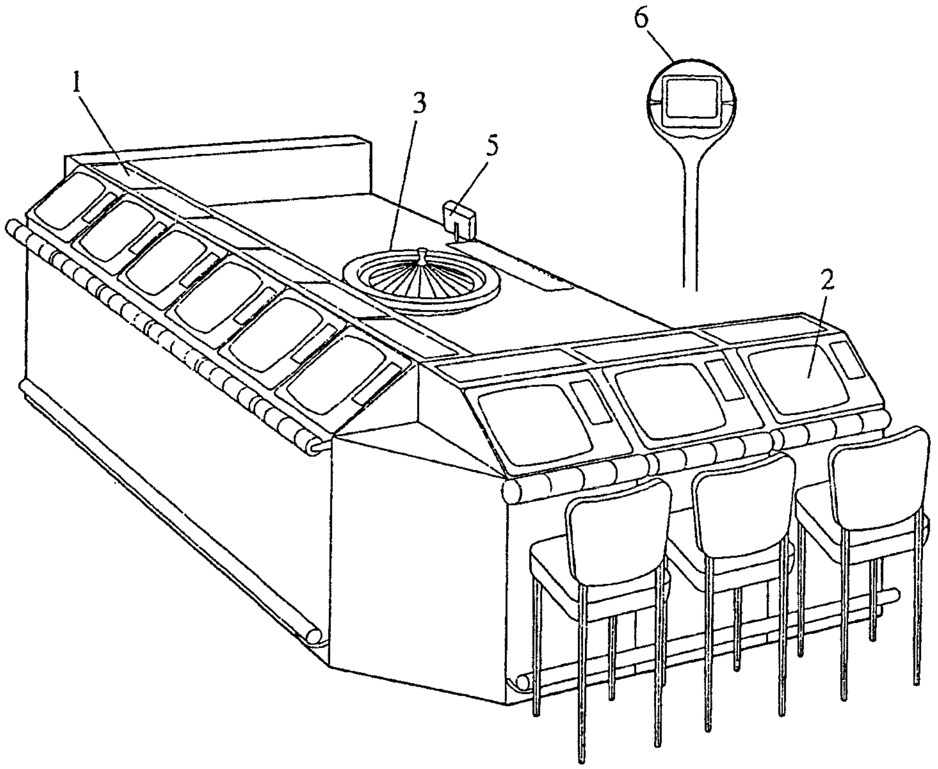
FIG. 1 shows a typical layout of a preferred embodiment of the present invention.

As can be seen from FIG. 1, a preferred embodiment of the present invention will include a gaming table 1, around which players will sit and operate respective automatic player terminals 2. The game outcome determinator in this case will be a traditional roulette wheel 3, which is operated in the normal manner by a human operator.

Situated close to the gaming table where the outcome is determined, is Central Controller 4 (CC 4) (not shown in FIG. 1). Central Controller 4 is connected to player terminals 2 as well as to a System Game Controller 5 (SGC 5). The player terminals 2 are used for placement of bets, display of winning bets, cash balances and promotional and other informative data. The screen of player terminal 2 displays an image of a playing surface related to the participating gaming table. Players may place their bets by following the instructions displayed on the screen as will be described in more detail below, with reference to FIG. 2.

The arrangement of the present invention may also include a "display tree" 6, which is used to display the outcome of the game. Optionally, the display tree 6 may also display the outcome of any number of the preceding games.

The CC 4 acts as an interface between the player terminals 2 and the SGC 5. The CC 4 monitors and processes payment amounts, buy-in amounts, winning results and bet positions.

The SGC 5 communicates with the CC 4 and can also be used to provide data and statistical information to casino databases. The dedicated gambling table dealer operates the SGC 5 to register buy-in amounts and allocates these to individual player terminals and processes winning and losing results. It also maintains transaction records and communicates winning result information to the CC 4, and provides information to the gaming table operator and CC 4 regarding cash out amounts when players finish playing.

Figure 2:
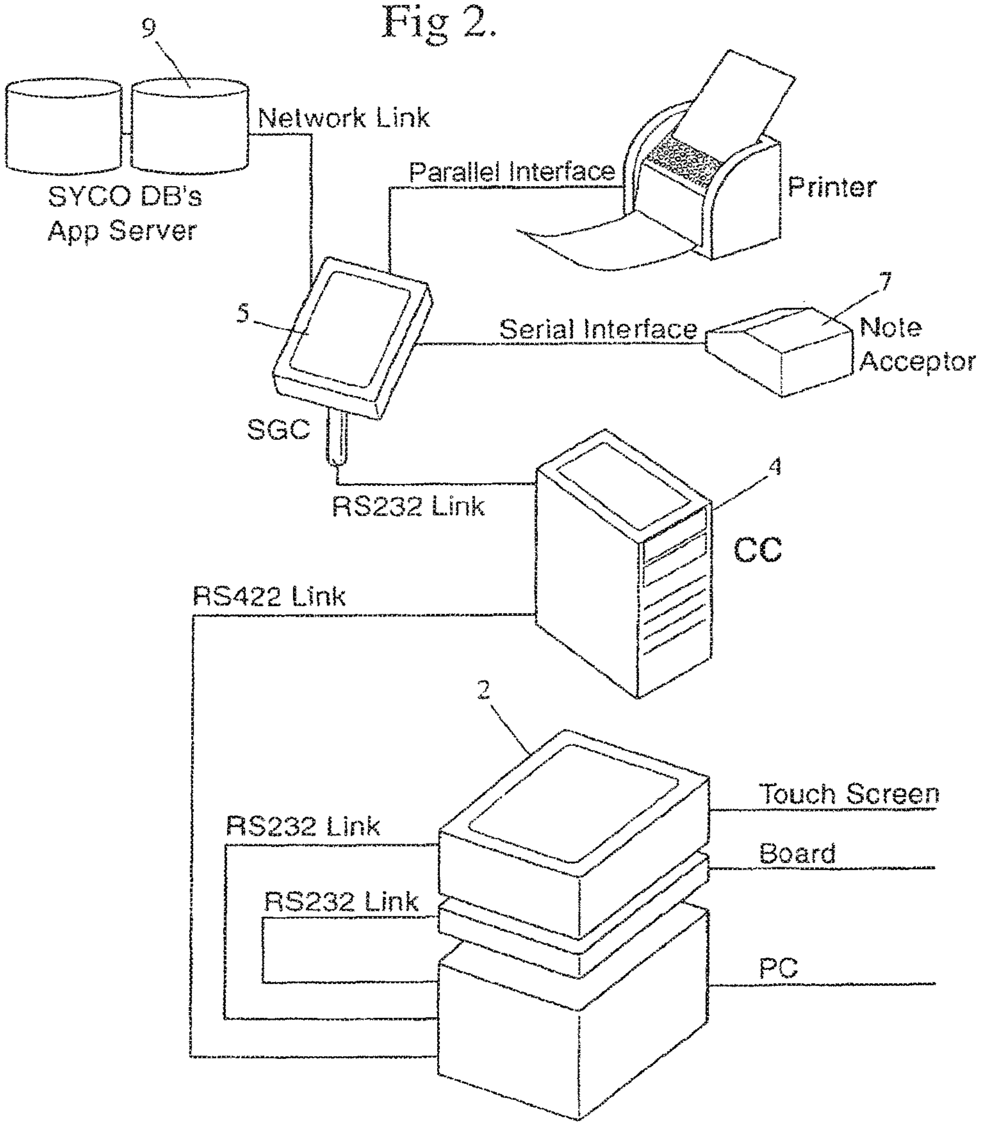
FIG. 2 shows a schematic block diagram of the layout of FIG. 1, showing how the various elements of the system are connected.

A schematic diagram of a typical layout of the invention is shown in FIG. 2, wherein like elements described above in relation to FIG. 1 are labeled accordingly.

Casino management databases 9 are connected to the SGC 5 via dedicated application server software. Furthermore, peripheral elements may include a Note Acceptor 7 that is connected to the SGC 5 via a serial interface and is responsible for processing all local currency. Under control of the croupier, notes fed into the Notes Acceptor will result in a credit being issued to the corresponding player's terminal for use throughout the game.

The Components

SGC

The SGC 5 controls game execution. While the croupier spins the roulette wheel to generate the game outcome, it is the SGC 5 that is responsible for handling buy-in and collect amounts, maintaining transaction history, processing patron ratings and generally administering the game.

Before the commencement of a game, the SGC 5 sends a new game request to the central controller which then confirms that all terminals are synchronized. The SGC 5 then initiates the countdown by sending the CC 4 a "Start Game" command, with the associated time limit which is then relayed to the player terminal screens and acknowledged.

The countdown time is the time allowed for players to place their bets. At the completion of the countdown period, the player terminals 2 will send respective betting information to the CC 4. If no bet is placed for a particular terminal within this time, the terminal 2 sends a "zerobet" packet to CC 4.

At the completion of the countdown, the CC 4 sends a message to the SGC 5 that the countdown has expired and polls for the acknowledgement from each terminal. All associated bet details are then passed to the SGC 5 via the CC 4. At this time, bets can no longer be placed, and the amount bet is deducted from the account balances stored on the respective player terminals 2. The croupier then calls "No More Bets," and spins the wheel to determine the winning number. The winning number is then confirmed by the croupier, as is discussed in more detail below, and is sent to the CC 4. The SGC 5 then calculates win/loss data for each player terminal 2, and each is then updated accordingly through the CC 4.

The countdown feature is also particularly advantageous to both players and the casino. The countdown allows players to be aware of the remaining time before having to place their bet. In traditional systems, there is no systematic way of knowing when the "end-of-bets time" is approaching. The croupier may call "last bets," but the final time is variable within limits. It is possible that the croupier will call "no more bets" just before a player decides where and in what amount to place the bet. When this happens, the player misses out on participating in that game and the casino misses out on the opportunity of winning the player's money.

With the countdown feature, this situation is avoided because the player can see that the final time for placing a bet is approaching, and knows exactly how much time remains in which to place the bet. Accordingly, if the player intends to place the bet for that particular game, he or she is more likely to do this before the betting time expires. In this way, the player will not be excluded from the given game for having missed out on placing the bet, and the casino is able to have bets placed in a more consistent manner, contributing to the increased profits provided by the system of the present invention.

CC

The CC is a multi-line user system running several processes needed to coordinate the game. The CC's role includes:

Game handler—calculation of winning amounts, updated player credits and handling of the game state;

Player terminal handler—detection of newly connected player terminal units, configuration of the player terminal units, upgrade of the player terminal unit software, detection of malfunctioning or disconnected units;

Casino Management system handler—transfer between local database and casino specific database, maintain integrity of data by moving essential data off the gaming floor and onto the area of high security;

Local database handler—provide a standard interface that game systems according to the present invention can access;

Local database—reliably store gaming data required for the reliable running of the game system, provide access to real time information needed during a game;

Gaming hardware handler—transformation of the signals from third party hardware into a format suitable for the system of the present invention;

Firewall—isolates the player terminal units from an external network, promoting a basic level of security, allowing the game system to exist on a single casino network without interference.

Player Terminals

The player terminals are employed as the interface between the player and the system of the present invention. The main components of the player terminal include:

Touch screen monitor—display of all selectable game features that relate to the dedicated gaming table;

PENTIUM® PC—interface between player functions as interpreted by the touchscreen monitor, which is then relayed to the CC in conjunction with, Interface Board—housed in a logic cage, handles all security issues and maintains the link ID of the player terminal machines.

Associated peripherals include, but are not limited to, bill acceptor, attendant key, accounting key, door sensors and player terminal specific software.

Figure 3:
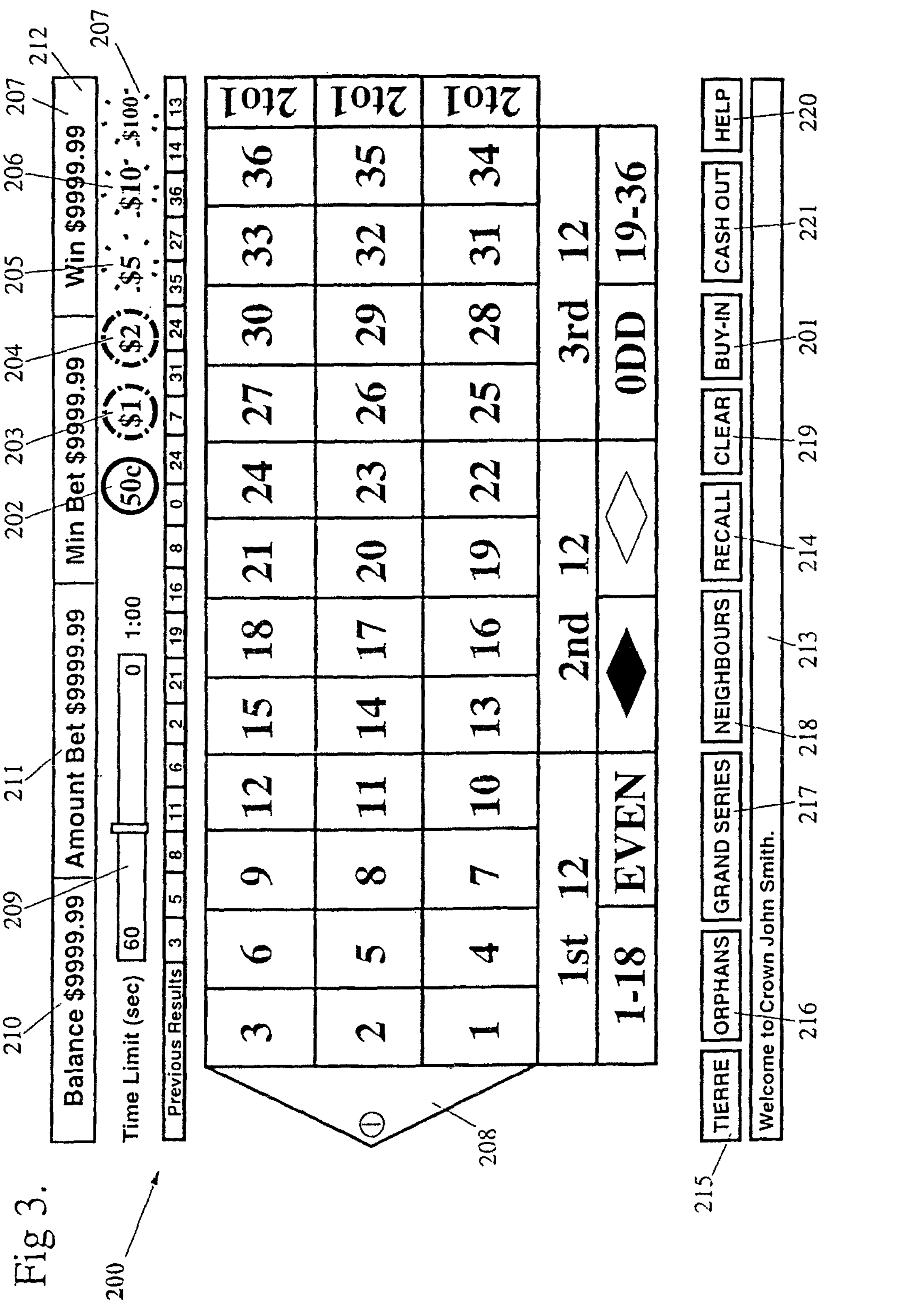
FIG. 3 shows an example of a screen display of a player terminal of the resent invention.

The operation of the player terminal 2 and screen display will now be described with reference to FIG. 3. FIG. 3 shows an example of a display that may be presented to a player on his or her corresponding player terminal. To play a game, the player must begin by pressing a "Buy-In" button 201 on a player terminal screen 200. The buy-in amount, (i.e., the amount of cash given by the player to the croupier) will be processed by the croupier through the SGC 5 and credited via the CC 4 to the player's terminal.

As described above, before the commencement of a game, the SGC 5 sends a "Start Game" command to the CC 4, which in turn ensures that all player terminals are synchronized so that each player is given the same time in which to place their bets. During the countdown, bets can be placed by dragging the selected denomination chip (202-207) over the betting layout 208 to the desired location.

Chips can be placed over existing chips on the layout to increase the bet at that location. Once the chip is placed on the layout, the size of the chip will reduce y about 20-30% so as to best fit on the layout area. It will then change to a standard color and the number value in the middle of the chip will display the total bet amount on the layout at that particular location. For example, if two $5 chips, two $2 chips and a $1 chip are placed on a single location on the layout, the image of the chip at that spot will display a value of $15. To remove a bet, the chip is selected and dragged off the layout to reduce the amount of the bet. This dragging may be done via a conventional mouse device, or may be done simply by dragging a finger across the screen of the touch screen terminal.

The display on the terminal will also indicate the time remaining for betting (209), the current balance (210), the current amount bet (211) and the win amount (212). The current balance is updated at the completion of each game cycle and is equal to the previous cash balance plus any wins for that game minus the cash bet in that game.

At the completion of the countdown, the CC 4 will poll all the active player terminals, and then send all of the bet details and balances to the SGC 5. If the amount bet does meet the minimum requirement of the table and is greater than zero, then a message will be displayed on a player terminal status bar 213, and an "invalid bet" message will be displayed on the player terminal and also sent to the SGC 5.

After the winning number and winning wages information is received from the SGC 5, the CC 4 passes the information to each player terminal, and the player terminal will flash the winning combinations of only those chips on the betting layout that have won. When the gaming cycle begins again, the layout display will be cleared of all bets placed in the previous game.

A number of other options are available and may be controlled by buttons on the display screen:

A "RECALL" button 214, is used to repeat the betting layout of the last game cycle;

A "CASH OUT" button 221 is used to inform the dealer that the player wishes to collect his or her cash balance. The croupier will then process this request through the SGC 5. During this processing time, the player terminal 2 is disabled from betting. The cash balance will then be returned to zero balance on the player terminal via the CC 4 and the payment will be completed with the croupier paying to the player the cash equivalent of the balance in the form of gaming chips.

The "BUY-IN" button 201, as described above, is used to inform the croupier that the player wishes to join the game and/or to deposit funds in the player terminal cash balance. The croupier then processes the "buy-in" through the SGC 5. During this process, the player terminal is still able to process bets. The "buy-in" process will add the "buy-in" amount to the cash balance on the player terminal via the CC 4 and then will be confirmed by the player.

A "TIERRE" button 215, applies the following bet to the layout: a six-piece wager with one piece each on 5/8 split, 10/11 split, 13/16 split, 23/24 split, 27/30 split and 33/36 split.

An "ORPHANS" button 216, applies the following bet to the layout; a five-piece wager with one piece each on: 1 straight up, 6/9 split, 14/17 split, 17/20 split and 31/34 split.

A "GRAND SERIES" button 217 applies the following bet to the layout: a nine-piece wager with one piece each on: 4/7 split, 12/15 split, 18/21 split, 19/22 split, 32/35 split, and two chips each on 25/29 corner and 0/2/3 street.

A "NEIGHBOURS" button 218 applies the following bet to the layout, a five-piece wager covering the winning number from the previous spin, and the two numbers either side of it on the roulette wheel.

A "CLEAR" button 219 is used to clear the layout during the bet countdown.

A "HELP" button 220 is used to display game results, pay-out structures and system definitions.

The "TIME LIMIT" slider 209 is used to represent the betting countdown clock. It is in a scale of seconds and configurable depending on the time limit set for the game on the SGC 5. Once the slider reaches zero seconds, the player terminal will disallow any transactions by the player on the terminal.

An optional display on the terminal screen might also allow the player to view bets placed by other players. This may take the form of other players' chips being displayed in different colours on the display of the board layout.

Figure 4:
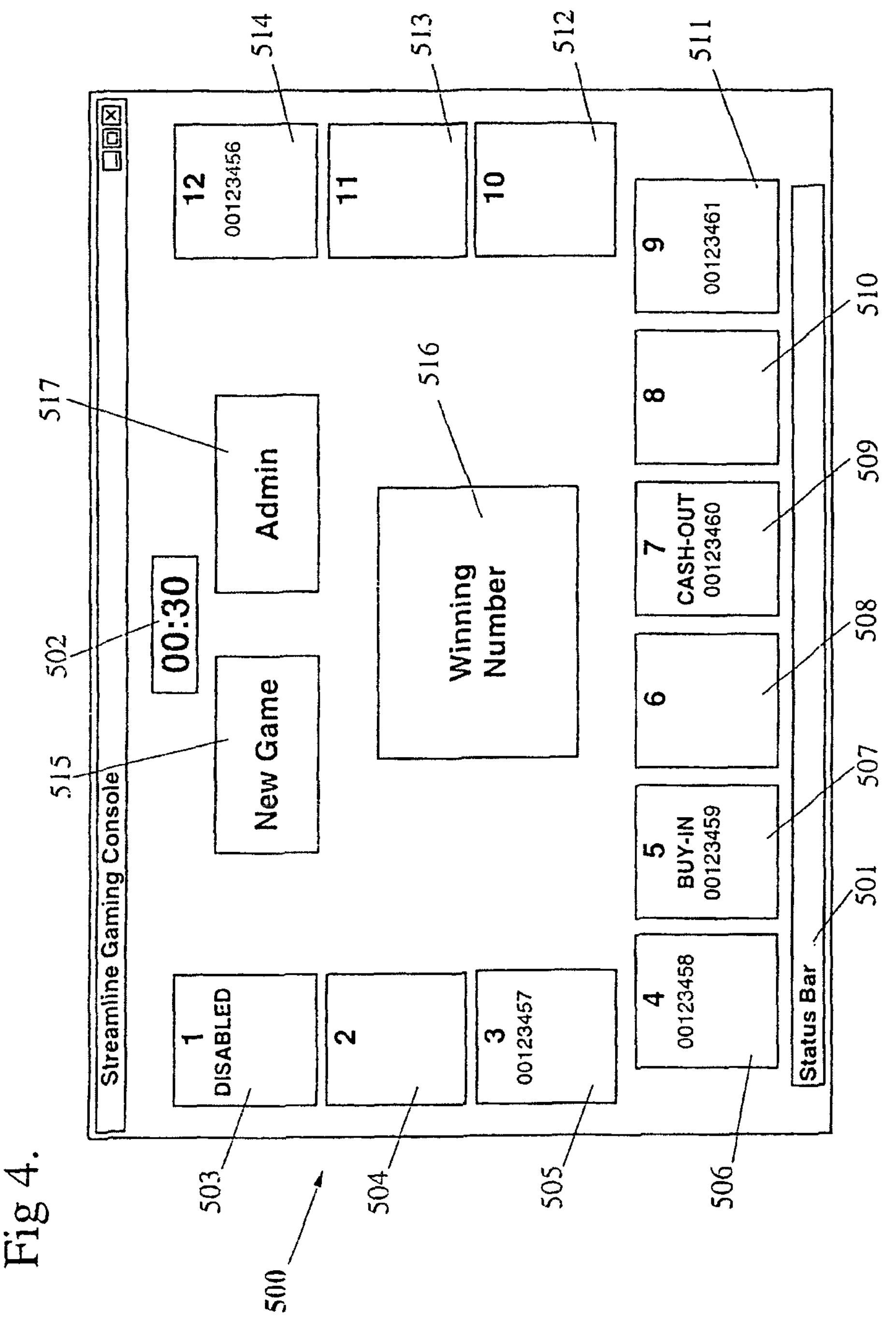
FIG. 4 shows an example of a screen display of the System Game Controller of the present invention.

The function of the SGC 5 will now be described in more detail with reference to FIG. 4. FIG. 4 shows an example of a screen display 500, which may be viewed by the croupier running the game, and represents various options available. Every screen on the SGC has a status bar 501, which displays comments and instructions relevant to the operation of the game, and a game clock 502, that allows the croupier to see the current amount of time remaining for bet allocation on the player terminal 2. The main screen on the SGC 5 allows the croupier to view all player terminal locations with a status, which may be defined by a colour code. In FIG. 4, the various player terminals are represented by squares located along the borders of the SGC 5 screen display and numbered 504 to 514. Various information is displayed on different player terminal squares to represent the current status of particular player terminals. For example, player terminal 503 is indicated as being disabled, while the display of terminal 507 indicates that the player on that terminal has just bought in to the game. Terminals 509 and 510 indicate that the players have selected the "cash-out" option as described above, and are collecting the balance of the credit allocated to their terminal in the form of gaming chips.

Block 515 will initiate a "New Game," which initiates a command to the CC 4 to commence the game clock for setting on all active player terminals. The "New Game" block 515 will be disabled when game countdown has commenced, or when the game is in pause mode, and will be re-enabled once the winning number is confirmed. A "Winning Number" box 516 will display the winning number, and will need to be confirmed by the croupier, who views the actual outcome of the game by observing the actual position of the ball on the roulette wheel 3, and verifying that the actual winning number is the same as that displayed in box 516. This confirmation is done by the croupier touching box 516. If the number displayed in box 516 is incorrect, confirmation will be declined, and the SGC 5 will advance the croupier into a "winning number input and confirmation" screen. This will allow the number to be manually input and confirmed. The "Winning Number" box 516 will also display a message to direct the croupier to spin the ball on the roulette wheel. This message is displayed once the SGC 5 is informed by the CC 4 that all transactions have been completed.

Alternatively, the system will not read the winning number at all. Rather, the croupier will observe the outcome of the game and enter the winning number into the system. The system then processes the input information as previously described.

Administration box 517 allows the croupier to control a number of specific functions, such as pausing a current game, configuring min/max bets and opening and closing the table.

The system described above accordingly provides many advantages over current table games. In particular, the system improves security in that it is far more difficult for a player to attempt to cheat, and reduces the risks of miscalculations being made by the croupier. Furthermore, the system allows more players to play per table, is more attractive to players who may be otherwise intimidated, provides greater flexibility in betting options and improves the ratio of earnings to outgoings for the casino in terms of croupier salary per number of players.

While the above description has been focused on the game of roulette, it will be understood that the principles of the invention may be equally applied to any suitable gaming table, to provide the above advantages. Such suitable table games include Sic Bo, Big Wheel, Two Up and Mini Baccarat.

It will also be appreciated that the above description has been given in relation to a preferred embodiment only, and is not meant to be limited to the specifics of the disclosure, which may vary in many ways as would be understood by the person skilled in the art, within the scope of the present invention.

What is claimed is:

1. A gaming system, comprising:

at least one processor;

a random outcome apparatus for a table game configured to initiate a random game outcome;

a plurality of player terminals, each player terminal including a player user interface comprising a display to permit a player to select at least one possible result associated with a random game outcome and to receive at least one wager from the player on the at least one selected possible result;

a dealer terminal operably coupled to the at least one processor and including a dealer user interface, the dealer user interface configured to enable a dealer to directly credit a player terminal after receipt by the dealer from the player of payment for wagering from a player associated with the respective player terminal;

the at least one processor programmed to:

provide player terminals of the plurality with a graphical indication of a time remaining in a same time limit for placement of wagers before commencement of game play, the graphical indication comprising a graphically changeable, non-numeric indication of the time remaining until completion of the same time limit and configured for substantially continuous visible representation of changes in the time remaining on the displays of the player terminals;

determine winning wagers corresponding to at least one result associated with a random game outcome;

credit winning proceeds for display at player terminals associated with the winning wagers; and automatically poll each player terminal for wager details and balances upon the completion of the time limit for placement of wagers, wherein the dealer terminal is configured to enable the dealer to debit a player account so as to pay out by the dealer directly to the player in physical form, upon request by the player, a remaining credit balance associated with a player terminal in use by the player.

* * * * *